Figure 3:
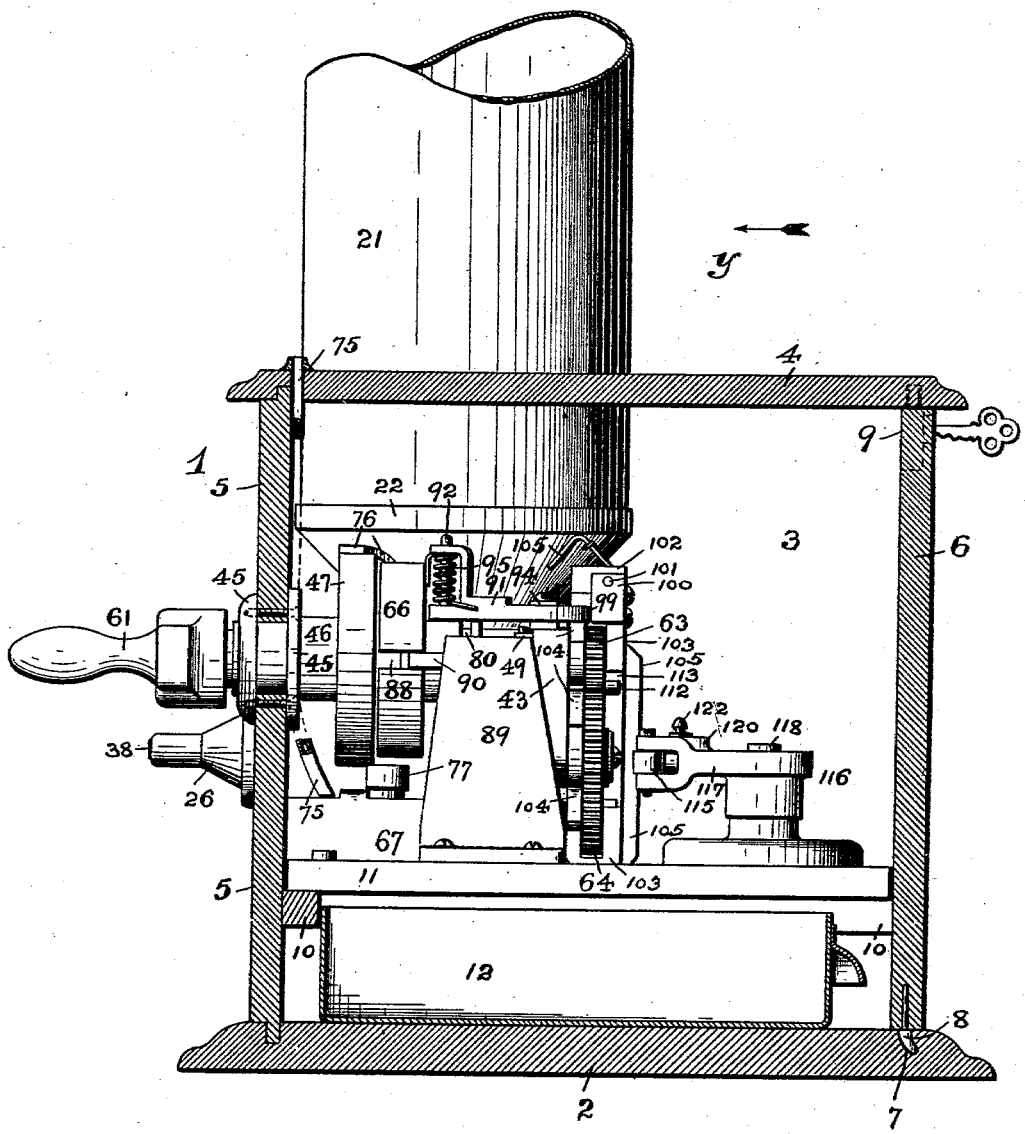

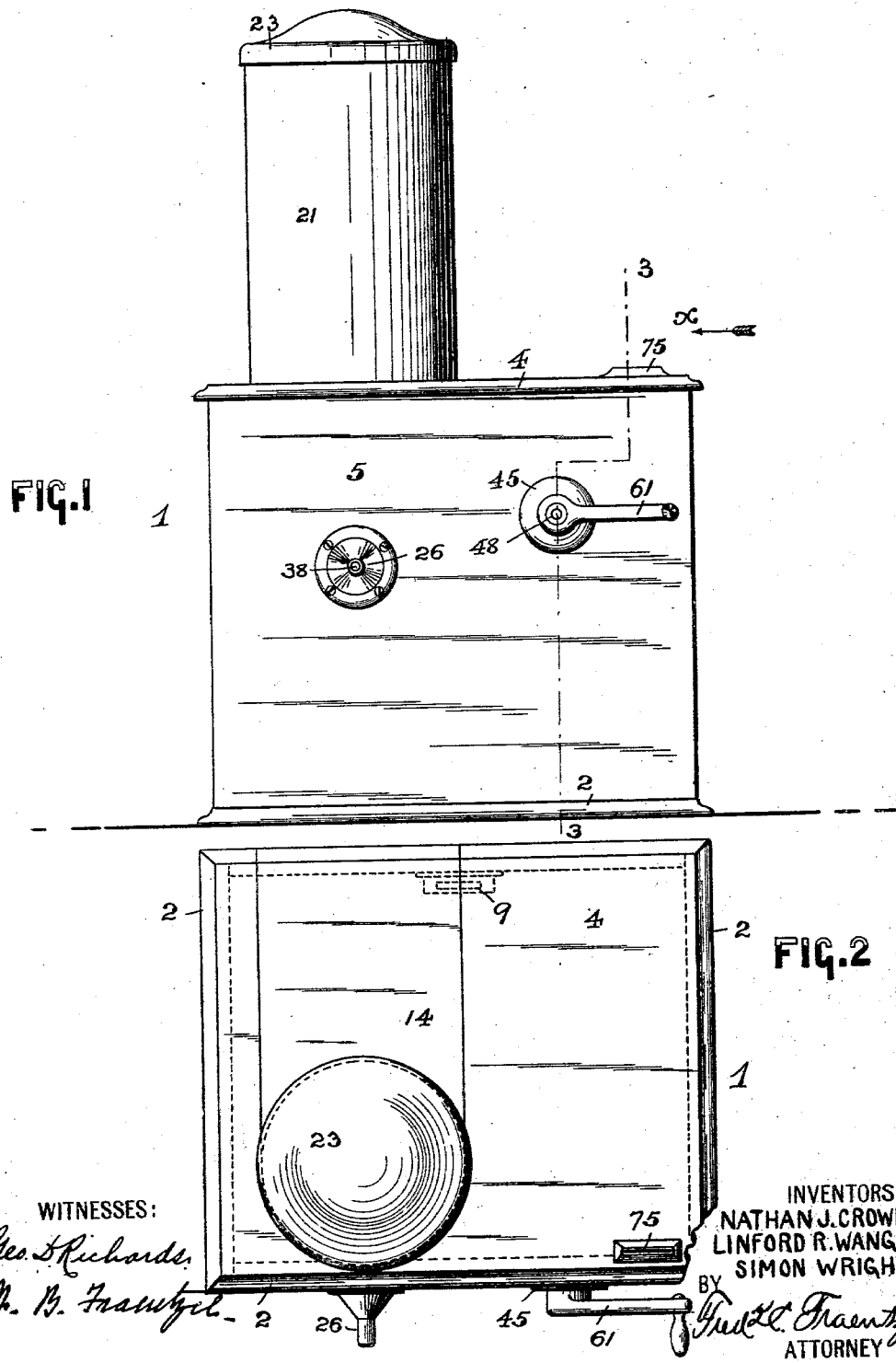

No. 717,817. PATENTED JAN. 6, 1903.
N. J. CROWELL, L. R. WANGER & S. WRIGHT.
SOAP DISPENSING APPARATUS.
APPLICATION FILED FEB. 19, 1902.
NO MODEL. 9 SHEETS—SHEET 3.
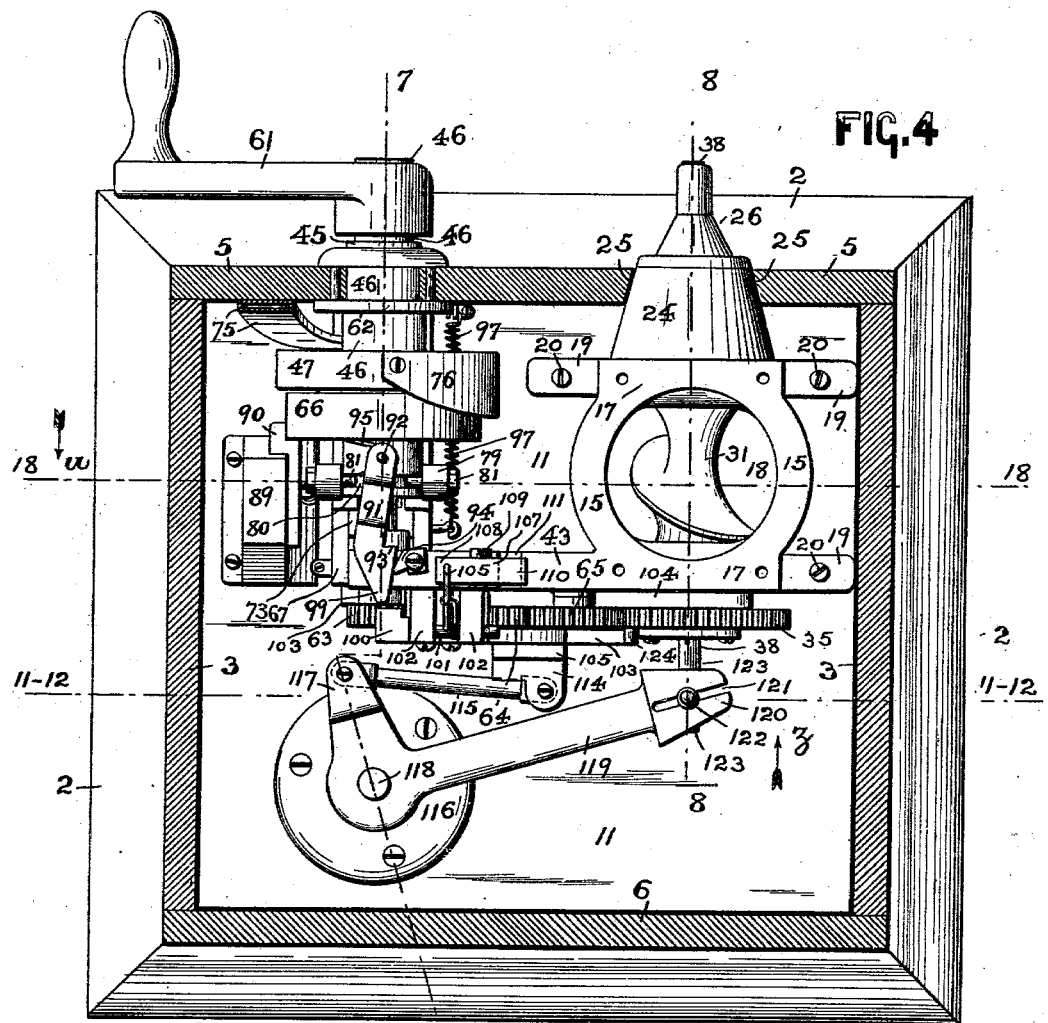
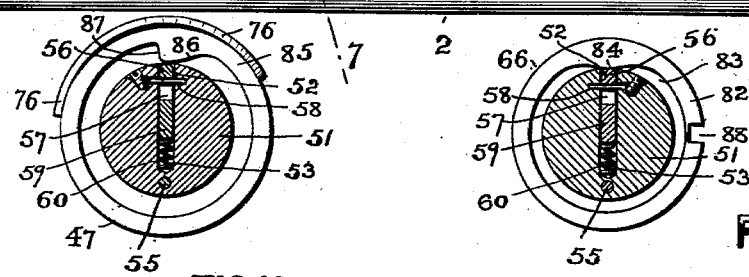
WITNESSES:
INVENTORS:
NATHAN J. CROWELL,
LINFORD R. WANGER,
SIMON WRIGHT.
BY
ATTORNEY No. 717,817. PATENTED JAN. 6, 1903.
N. J. CROWELL, L. R. WANGER & S. WRIGHT.
SOAP DISPENSING APPARATUS.
APPLICATION FILED FEB. 19, 1902.
NO MODEL. 9 SHEETS—SHEET 4.

WITNESSES:

INVENTORS:
NATHAN J. CROWELL,
LINFORD R. WANGER,
SIMON WRIGHT.
BY
ATTORNEY

No. 717,817. PATENTED JAN. 6, 1903.
N. J. CROWELL, L. R. WANGER & S. WRIGHT.
SOAP DISPENSING APPARATUS.
APPLICATION FILED FEB. 19, 1902.

NO MODEL. 9 SHEETS—SHEET 5.

WITNESSES:

INVENTORS:
NATHAN J. CROWELL,
LINFORD R. WANGER,
SIMON WRIGHT.
BY
ATTORNEY

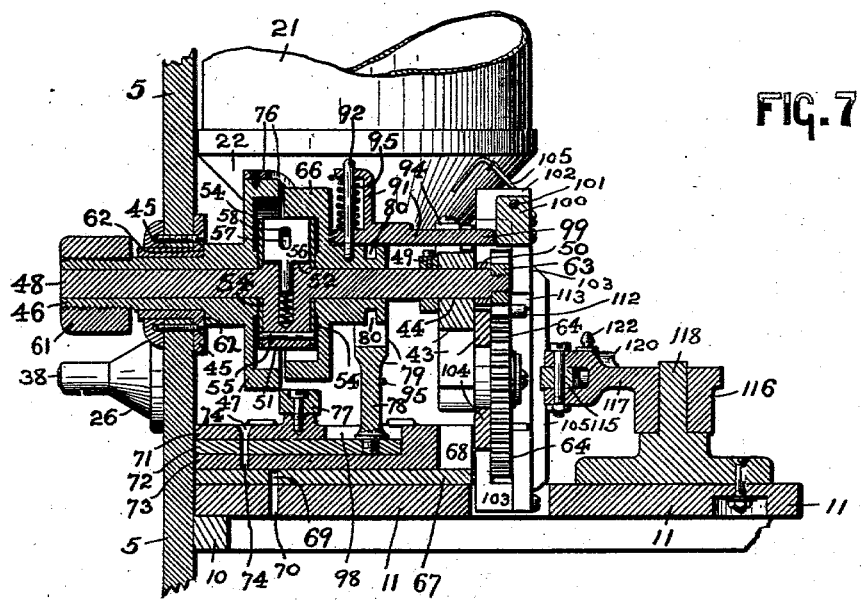

No. 717,817. PATENTED JAN. 6, 1903.
N. J. CROWELL, L. R. WANGER & S. WRIGHT.
SOAP DISPENSING APPARATUS.
APPLICATION FILED FEB. 19, 1902.

NO MODEL. 9 SHEETS—SHEET 7.

WITNESSES:
Geo. A. Richards
W. B. Fraentzel

INVENTORS:
NATHAN J. CROWELL,
LINFORD R. WANGER,
SIMON WRIGHT.
BY
Fred C. Fraentzel
ATTORNEY No. 717,817. PATENTED JAN. 6, 1903.
N. J. CROWELL, L. R. WANGER & S. WRIGHT.
SOAP DISPENSING APPARATUS.
APPLICATION FILED FEB. 19, 1902.

NO MODEL. 9 SHEETS—SHEET 3.

WITNESSES:
Geo. D. Richards
R. B. Fraentzel

INVENTORS:
NATHAN J. CROWELL,
LINFORD R. WANGER,
SIMON WRIGHT.
BY
Fred L. C. Fraentzel.
ATTORNEY

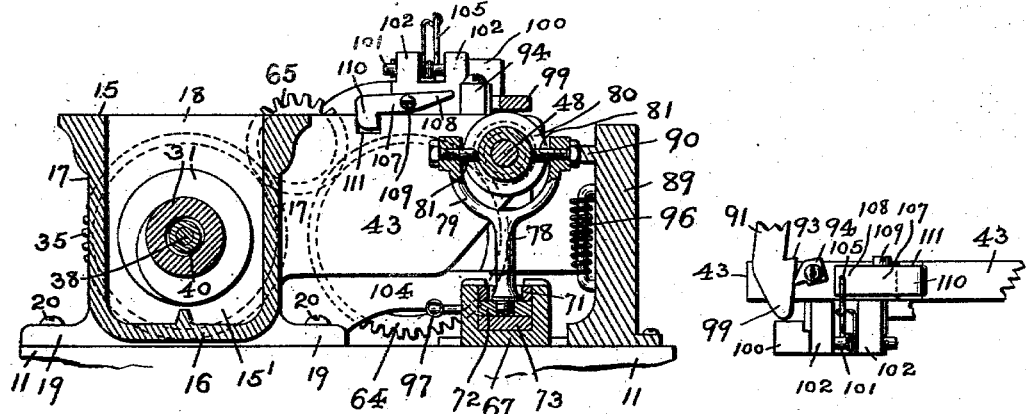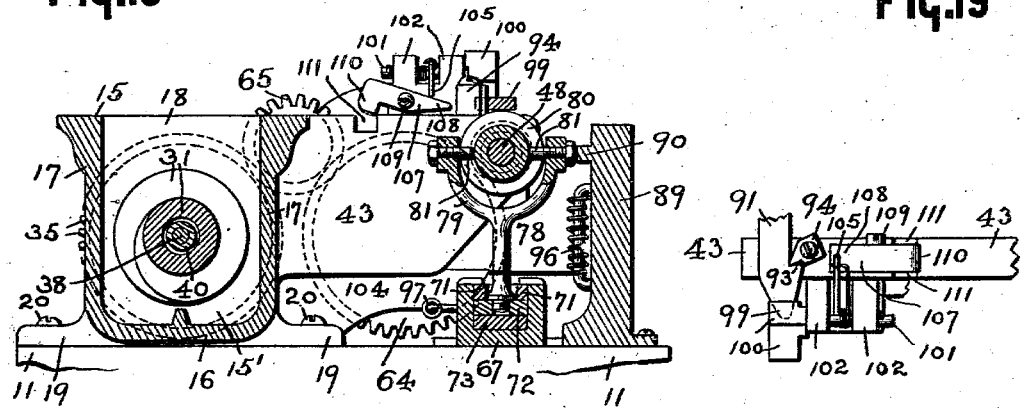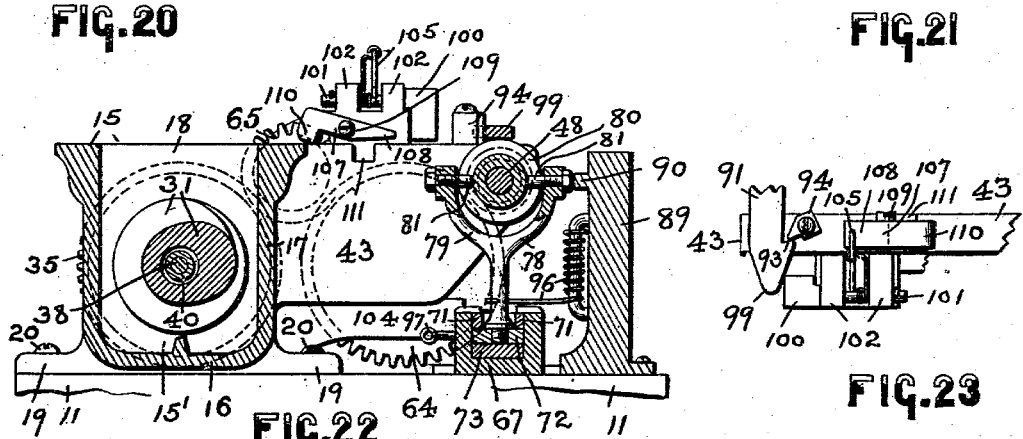

UNITED STATES PATENT OFFICE.

NATHAN J. CROWELL, LINFORD R. WANGER, AND SIMON WRIGHT, OF NEWARK, NEW JERSEY.

SOAP-DISPENSING APPARATUS.

SPECIFICATION forming part of Letters Patent No. 717,817, dated January 6, 1903.

Application filed February 19, 1902. Serial No. 94,734. (No model.)

*To all whom it may concern:*

Be it known that we, NATHAN J. CROWELL, LINFORD R. WANGER, and SIMON WRIGHT, citizens of the United States, residing at Newark, in the county of Essex and State of New Jersey, have invented certain new and useful Improvements in Soap-Dispensing Apparatus; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference generally to improvements in coin-controlled apparatus; and the invention relates more particularly to a novel construction of machine or apparatus of the character and for the purposes to be hereinafter more fully set forth.

The present invention has for its primary object the production of a novel and sanitary means for dispensing soap, the arrangement and construction of the soap-delivery mechanism being such that no two persons touch the same soap, which is a great sanitary feature in apparatus of this character, and all possibility of contracting disease of any kind due to contamination with a piece of previously-used soap is avoided.

A further object of this invention is to provide a simple and effectively-operating mechanism for the dispensing of soap, which feature makes the machine especially desirable for use in places frequented by the public, and the arrangement and construction of the operating mechanism are such that when the mechanism has been released by the depositing of a coin and with the turning of a crank only a previously-determined quantity of soap in the form of a paste or powder is delivered directly upon the palm of the hands of the operator, and the delivered soap being entirely used up while rubbing it upon the hands there is no soap left to lie around and gather all kinds of dirt and dust, as with an ordinary cake of soap, which is always left lying around wet for any foreign substances to stick to it. Thus when the moisture that is on the outside of the ordinary cake of soap soaks into it the dirt from its last use becomes a part of the soap itself and often produces a very unsanitary condition. With our present invention these serious objections are fully overcome and a sanitary dispensing apparatus for the delivery of a predetermined quantity of soap paste or the like has been provided which is of the greatest benefit in public lavatories, in railway-stations, theaters, parks, and many other places.

With these several objects hereinabove stated in view our invention consists, primarily, in the novel construction of soap-dispensing apparatus to be hereinafter fully set forth; and, furthermore, the invention consists in the novel arrangements and combinations of the devices and parts thereof, as well as in the details of the construction of the same, all of which will be fully described in the following specification and then finally embodied in the clauses of the claim.

The invention is clearly illustrated in the accompanying drawings, in which—

Figure 5:
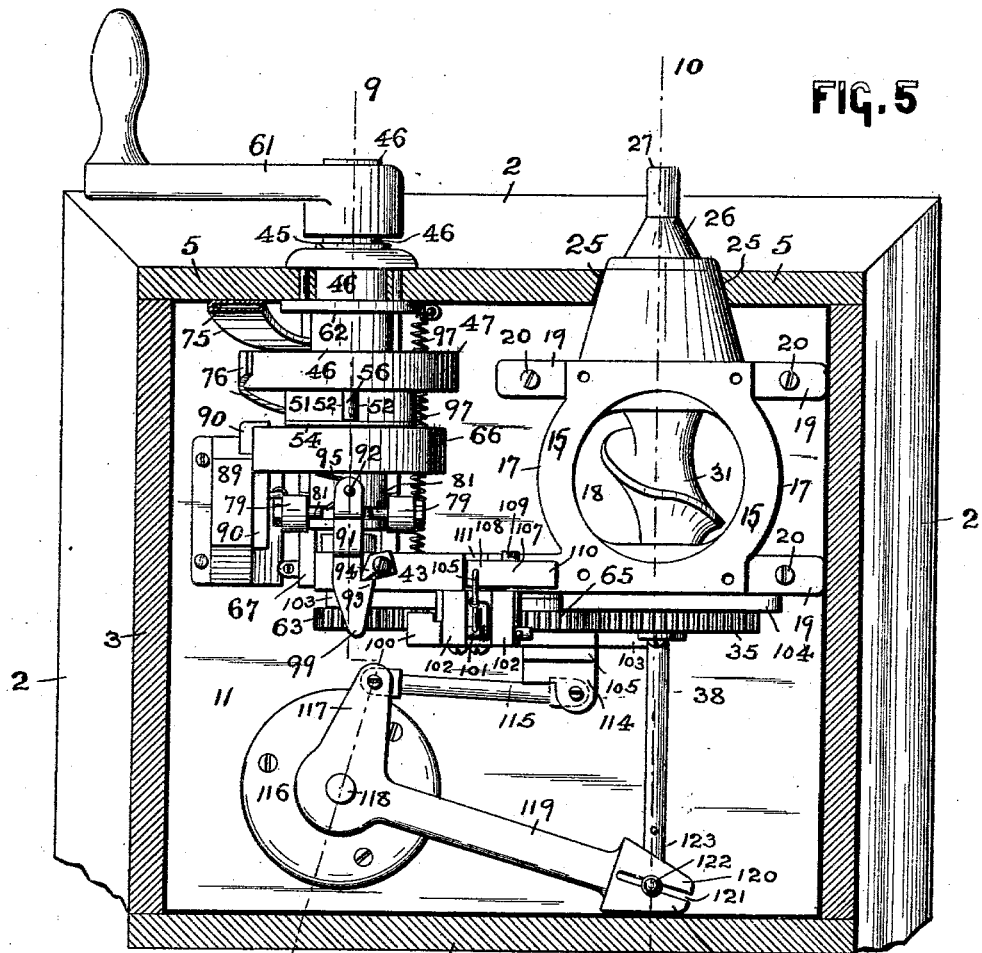
Figure 6:
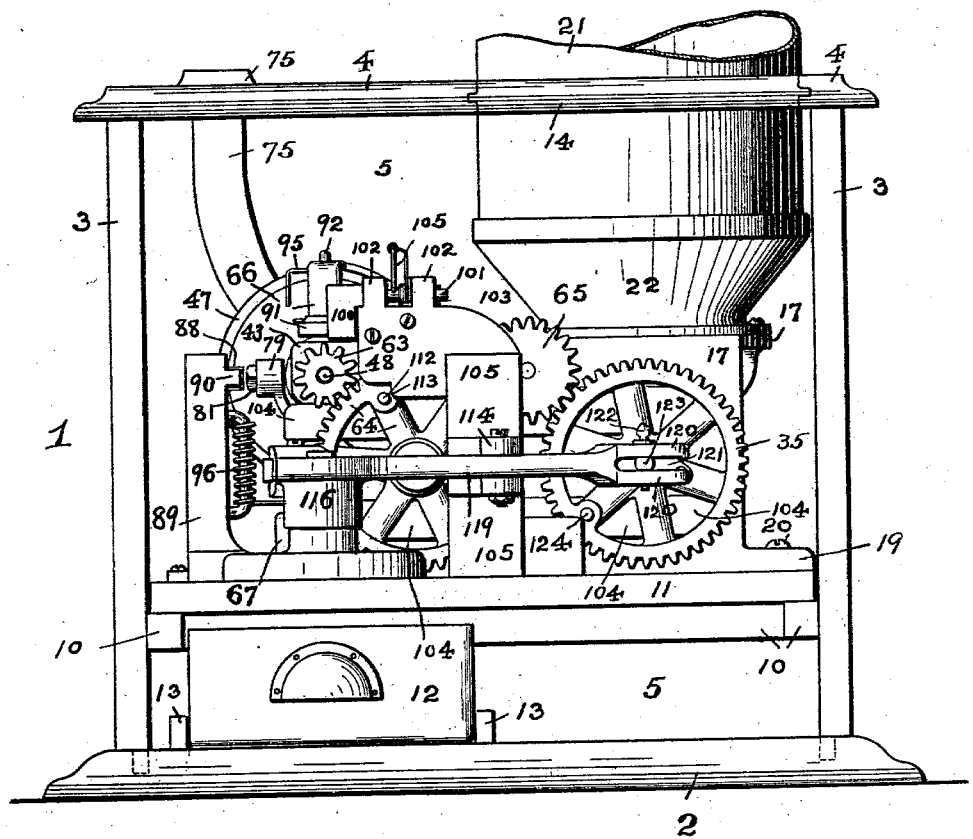
Figure 17:
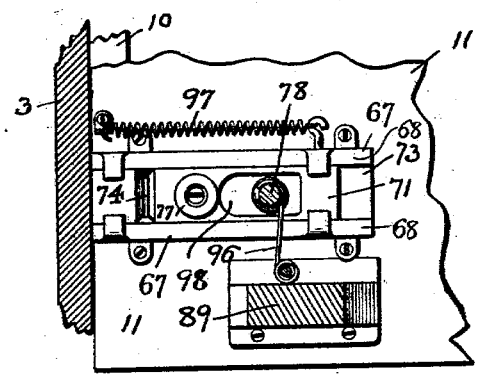
Figure 9:
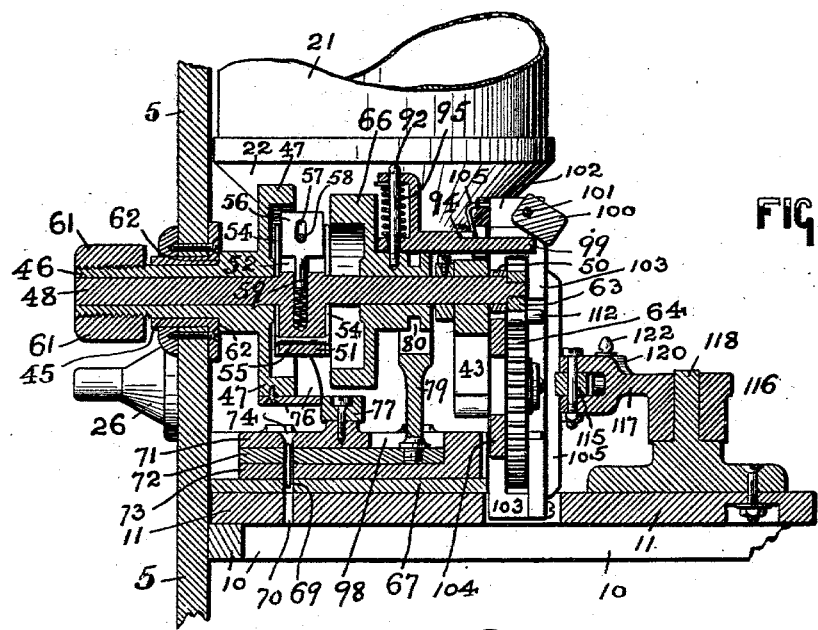
Figure 10:
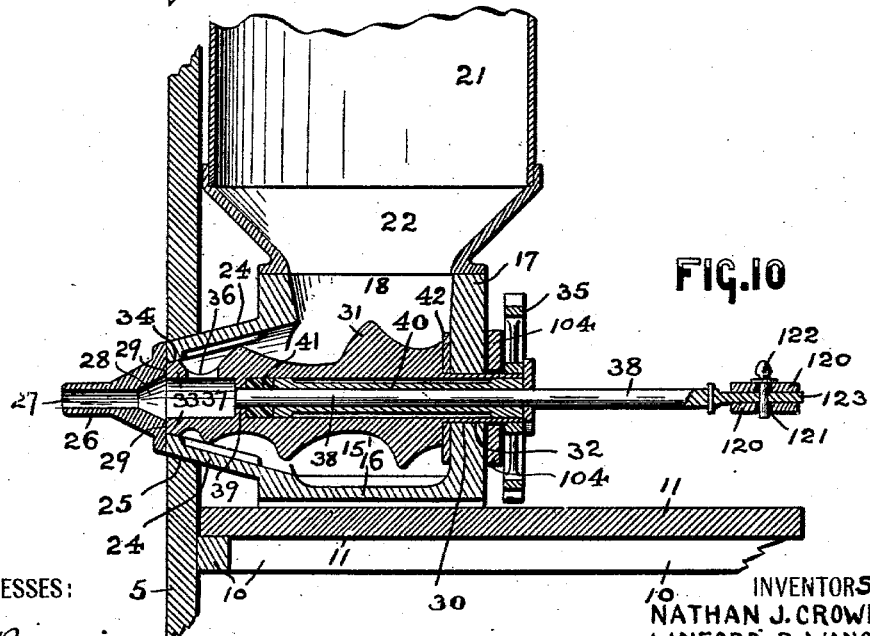
Figure 11:
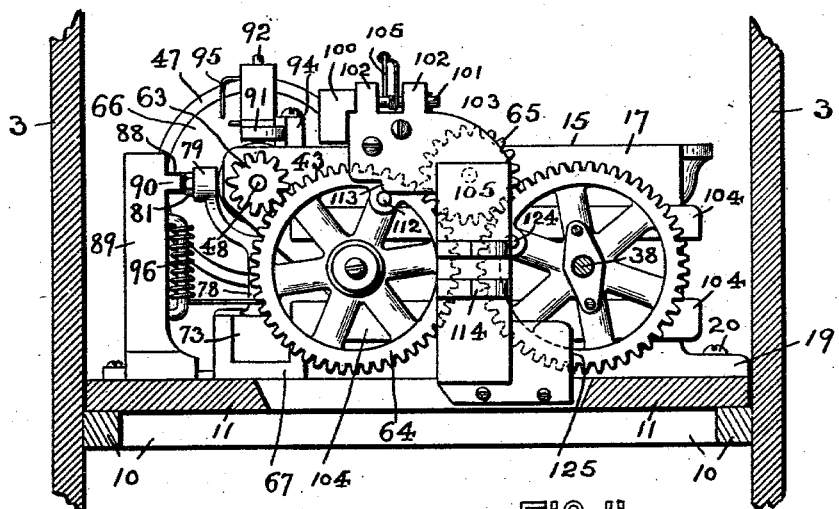
Figure 12:
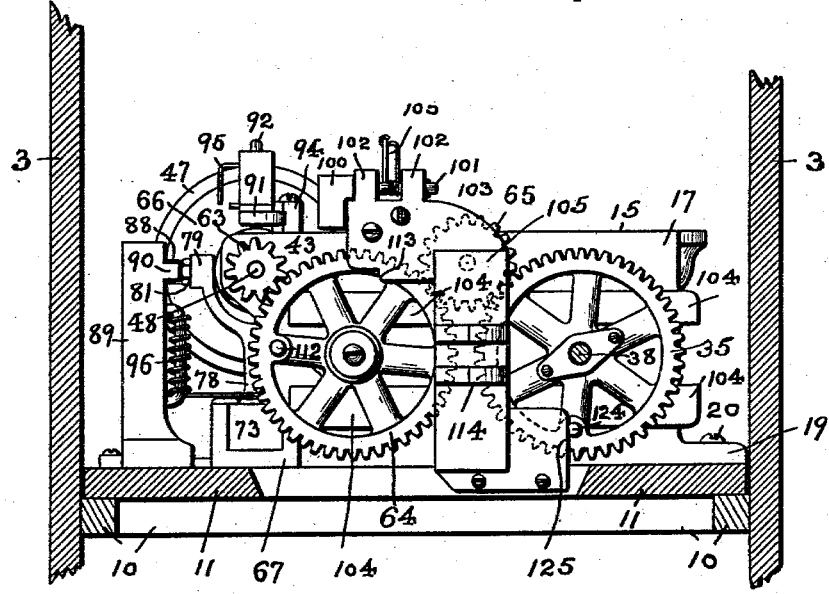

Figure 1 is a front view of one form of soap-dispensing machine or apparatus made according to the principles of the present invention, and Fig. 2 is a top or plan view of the same. Fig. 3 is a side elevation of the operating mechanism of the device with the several parts thereof in their normally locked and inoperative relations to each other, the inclosing casing of the apparatus being represented in vertical section, said section being taken on line 3 3 in Fig. 1 and the mechanism of the apparatus being represented when looking in the direction of the arrow $x$ in said Fig. 1. Fig. 4 is a horizontal section of the casing of the apparatus with the operating mechanism represented in plan view and all the parts thereof being shown in their initial or starting positions, and Fig. 5 is a similar view of the inclosing casing and the mechanism in one of its actuated positions while dispensing some of the soap. Fig. 6 is a rear view of the operating mechanism of the device with the several parts of the mechanism represented in their initial or starting positions looking in the direction of the arrow $y$ in said Fig. 3 and with the door at the rear of the casing removed. Fig. 7 is a vertical section taken on line 7 7 in Fig. 4, and Fig. 8 is a similar section taken on line 8 8 in the same figure. Fig. 9 is a vertical section taken on line 9 9 in Fig. 5, and Fig. 10 is a similar section taken on line 10 10 in said Fig. 5. Figs. 11 and 12 are sectional representations of the operating mechanism, taken on line 11–12 and 11–12 in said Fig. 4, looking in the direction of the arrow $z$ in said Fig. 4, but the mechanism illustrated in said two Figs. 11 and 12 being represented in variously-advanced positions for producing the positions of the parts of the said mechanism represented in both Figs. 4 and 6. Figs. 13, 14, 15, and 16 are sectional representations of a clutch device employed with the mechanism, the parts of the clutch device being represented in their variously-advanced and operative positions. Fig. 17 is a detail plan or top view of a coin-lock employed with the mechanism for causing the operative engagement of the parts of the clutch device and the actuation of the other devices and parts of the soap-delivering mechanism. Fig. 18 is a vertical cross-section of the mechanism, said section being taken on line 18 18 in Fig. 4 of the drawings, looking in the direction of the arrow $u$; and Fig. 19 is a plan detail of a catch mechanism employed with the parts which are represented in said Fig. 18. Figs. 20 and 22 are vertical representations of the various parts indicated in said Fig. 18; and Figs. 21 and 23 are plan details of the catch mechanism represented in said Fig. 19, the catch mechanism in all of the said Figs. 20 to 23, inclusive, being illustrated in its successively-operated positions during the various positions of the general mechanism for actuating the soap-delivery device.

Similar characters of reference are employed in all of the said above-described views to indicate corresponding parts.

The apparatus consists, essentially, of a suitable box or casing 1, either of wood or metal, which may be suitably ornamented as desired and is of the general shape and configuration indicated in the accompanying drawings, although it will be clearly understood that the shape of the casing and its ornamentation may be varied whenever found necessary. In the present form of casing 1 the same comprises a suitable base 2, the sides 3, a front 5, and a top 4, all suitably secured together in any well-known manner. The open rear or back of the box or casing is closed by means of a door 6, held in its closed position by means of suitable lugs or projections 8, which are fitted in correspondingly-placed recesses 7 in the base 2, and by means of a suitable lock, as 9, which can be made to engage with the top 4, as clearly indicated in Fig. 3 of the drawings. Slidably arranged within the said casing or box 1 upon cleats or guides 10 is a shelf 11, and beneath the said shelf we have arranged a money-receiving box or receptacle 12, preferably placed between a pair of guides 13, as shown. Both the said shelf 11 and the receptacle 12 can be withdrawn from the box or casing 1 when the door 6 has been removed, substantially as and for the purposes to be hereinafter more particularly described. The said top 4 of the box or casing 1 is also provided with a sliding panel 14, (illustrated in Figs. 1 and 6,) which is held in its closed position against displacement by the bolt of the lock 9 when the same is forced into a continuous slot in the lower surfaces of the said panel 14 and the top 4 directly across their adjacent edges, as indicated in the dotted outline in Fig. 2 of the drawings.

Having thus set forth the general construction and configuration of the inclosing box or casing of the apparatus, we will now describe the general construction and arrangement of the various parts of the dispensing mechanism and the coin-controlled means for actuating the same. This mechanism, as will be seen from an inspection of the several figures of the drawings, is suitably secured in place upon the previously-mentioned sliding shelf 11. This mechanism comprises generally a suitably-shaped receiving device or vessel 15′, formed with a bottom 16, the surrounding sides 17, and an open top 18. Lugs 19 extend from the lower marginal edge of the said receiver, the said lugs 19 being provided with suitable fastening devices, such as screws 20, by means of which the receiver is securely fixed in its proper position upon the said shelf 11. Suitably secured upon the upper marginal edge 15 of the said receiver 15′ is a hopper 21, having an open bottom 22, which communicates with the open top 18 of the said receiver. The upper portion of said hopper 21 extends through a suitable opening in the top 4 of the box or casing 1, and the panel 14 is made at its one end with a cut-away part conforming to the shape of the said hopper, so that the parts when in place will fit closely to prevent tampering with the mechanism within the box or casing 1. The said hopper is for the purpose of containing a soap, preferably in the form of a paste or a powder, and the same is closed at the top by means of a cover 23, which can be locked in place in any usual manner, as will be clearly understood. The said receiver or vessel 15′ is also made in one of its sides, toward the front 5 of the casing or box 1, with a cone or other suitably-shaped feeding-nozzle 24, which extends into a correspondingly-formed opening 25 in the said front 5 and snugly fits in the said opening, as clearly illustrated. Suitably secured against the free marginal end portion of the said nozzle 24 is a delivery or discharge piece or spout 26, having a tubular part 27 made larger at the back, as at 28, but smaller than the minimum diameter at the free end of the feeding-nozzle 24, whereby an inner annular shoulder 29 is provided at the point where said discharge or delivery spout 26 is joined onto the said feeding-nozzle 24, substantially as illustrated in Figs. 8 and 10 of the drawings. In the side of the vessel or receiver 15', directly opposite the said feeding-nozzle 24, is a bearing or opening 30, in which is rotatively arranged a reduced end 32 of a suitably-constructed and hollow worm or conveyer 31. The opposite and cone-shaped end 33 of said worm or conveyer 31 is arranged against the previously-mentioned shoulder 29 and rotates directly against the same and within an inner marginal shoulder 34 as a bearing. The said worm or conveyer 31 is actuated by means of a suitable gear 35, which is secured directly upon the reduced end 32 of the worm or conveyer, and which end extends beyond the bearing in the receiver 15', as shown. When the said gear 35 is actuated in the manner to be hereinafter described and the worm or conveyer is revolved, then the soap paste in the receiver 15' is forced directly into the hollow portion of the feeding-nozzle 24 and through a laterally-extending opening 36 into the tubular part 37 of the said conveyer or worm, and thence finally into the spout 26, from which it is delivered at its open end, all of which is clearly represented in Fig. 10 of the drawings. In order that the said tubular spout 26 shall be closed after a proper quantity of soap has been delivered and to prevent the introduction of sticks, straws, or other foreign and objectionable matter into the interior of said spout, a rod 38 is slidably arranged in a bearing-shoulder 39 in the tubular part of the worm or conveyer and within a bearing-sleeve 40, also within the tubular part of the worm or conveyer, the said rod 38 being arranged in its various positions for alternately closing and opening the discharge-passage of the spout 26 by the mechanism hereinafter more fully described. Suitable packing devices 41 and 42 may be used with these parts of the mechanism to prevent the soap paste from being forced into the tubular parts of the said worm or conveyer 31, back of its internal annular shoulder 39, and through the bearing 30 for the reduced part 32 of the said worm or conveyer. The said receiver 15', hereinabove mentioned, is also made with a laterally-extending frame portion 43, arranged at right angles, or approximately so, to the central longitudinal axis of the worm or conveyer 31. In said frame portion 43, at or near the forward end of the same, is a suitable bearing 44, the said bearing being placed in alinement with a bearing 45 of any suitable construction in the front 5 of the casing or box 1. Rotatively arranged in the said bearing 44 and in the tubular hub 46 of a clutch-disk 47 is a shaft or spindle 48, the same being retained in position against lateral displacement by an arrangement of two collars 49 and 50, substantially in the manner illustrated in Figs. 7 and 9. The said shaft 48 is also made with a disk-shaped enlargement 51, which is provided with a laterally-extending slot 52 and a socket 53. A pair of plates 54 are secured against the opposite sides of the said enlargement 51, being held in place by means of a pin or rivet 55, and slidably arranged in said slot 52 is a clutch-dog 56. Said dog is provided with an elongated hole 57 and slides upon a pin 58, (see Figs. 13, 14, 15, and 16,) while a shank 59 on said dog extends into the socket 53 and presses upon a coiled spring 60, which is also arranged in said socket, as shown. Under normal conditions the said clutch-disk 47, which is chambered and partly encompasses the enlargement 51 of the shaft or spindle 48, as shown, and its tubular hub 46 can be made to rotate upon the said spindle or shaft 48 without actuating said shaft by means of a suitable crank 61, which is preferably screwed upon a left-handed screw-thread upon the free end of said hub 46, the said crank and a shoulder 62 on said hub preventing its lateral displacement from the said bearing 45. Upon the opposite end of the shaft or spindle 48 and adjacent to the collar 50 is a toothed pinion 63, which is in mesh with a larger toothed or gear wheel 64. The said gear 64 and an intermediately-placed pinion or idler 65, which is in mesh with the said gear 64 and the previously-mentioned gear 35, are both rotatively arranged upon the side of the frame portion 43.

Figures 15, 16:
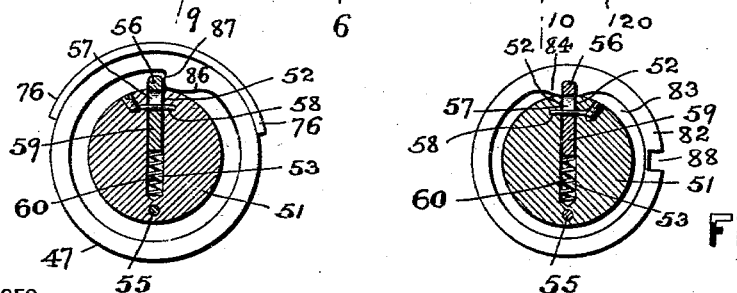

As long as the several parts just described are in the positions indicated in Fig. 7 of the drawings the clutch-disk 47 can be rotated in either direction loosely upon the shaft or spindle 48 by turning the crank 61 without in the least actuating the said shaft or spindle, and hence there will be no movement of the worm or conveyer 31 and the intermediate gears placed between the said worm or conveyer 31 and the pinion 63 on the shaft or spindle 48. The means for causing the operative engagement of the said clutch-disk 47 and the said shaft or spindle 48 is a coin-controlled device coöperating with a non-rotative disk or device 66, which is slidably arranged upon the said shaft or spindle 48 in the manner to be presently described. The said means consists, essentially, of a plate 67, which is provided with a pair of longitudinally-extending guiding-shoulders 68, (see Figs. 7 and 17,) and the said plate 67 being suitably secured upon the shelf 11 by means of suitable screws or in any other manner. The said plate 67 has a coin-slot 69 arranged directly over a corresponding slot 70 in the shelf 11 for the reception of the coin after the same has served its purposes to allow the coin to drop into the receiver 12. Sliding between the guides 68 of said plate 67 are slides 71, 72, and 73, which are provided with correspondingly placed and communicating slots 74 for receiving a deposited coin from a coin-chute 75. After a coin has been deposited in the slots 74 and the crank 61 is turned the clutch-disk 47 will also be rotated upon the spindle or shaft 48, thereby bringing a cam device 76, connected with the said disk 47, directly against a roller 77, rotatably arranged upon the upper slide 71. The several slides 71, 72, and 73 will then move in a forward direction, owing to the connection established by the coin in their slots, carrying therewith a post 78, which extends in an upward direction from the slide 72. The said post 78 is provided at its upper end with a yoke 79, having inwardly-extending pins or projections 81, which are operatively arranged in an annular groove 80, formed in the hub of the hereinabove-mentioned disk or device 66. This disk or device 66, as will be seen from an inspection of Figs. 14 and 16, is made with an annular flange 82, the same providing, with the main body portion of the said disk 66, a chamber 83. The said flange 82 is also formed with an inwardly-extending enlargement, as 84. When these various parts of the mechanism are in their normally-inoperative positions, then the said flange 83 will surround a part of the disk-shaped enlargement 51 of the spindle or shaft 48, with the clutch-dog 56 depressed against the action of the spring 60. When in this position, the edge of the said dog 56 will also rest against a curved surface 86 on the annular shoulder 85 of the clutch-disk 47, as illustrated in Fig. 13. Now as soon as the crank 61 is operated, after having dropped a coin in the coin-chute and said coin has become arranged in the slots 74 of the slides 71, 72, and 73, then the cam-disk 76 as it engages with the roller 77 forces the said three slides 71, 72, and 73 from their positions indicated in Fig. 7 to the positions represented in Fig. 9. The post 78 at the same time slides the disk 66 laterally upon the shaft or spindle 48, whereby the said spring-actuated dog 56, becoming disengaged from the projection or enlargement 84, and the curved surface 86 of the shoulder also having been rotated to one side, a shoulder or stop 87 will after the disk 47 has been sufficiently rotated be brought in engagement with the end of the clutch-dog 56, and thereby causes the shaft or spindle 48 to be set in action and turn with the said clutch devices. The turning of the said shaft or spindle 48 then produces a rotary motion of the several gears 63, 64, 65, and 35, by means of which the worm or conveyer is set in motion. To prevent any rotary motion of the loosely-arranged disk or device 66 upon the shaft or spindle 48, the said disk is made in its peripheral edge with a slot or cut-away part, as 88, which is fitted over a laterally-extending guide-bar 90 upon a standard or post 89, the same being arranged in such a manner so as not to interfere with the lateral sliding movement of said disk 66 when operated by the post 78 and the coin-controlled slides in the manner hereinabove set forth. At the same time that the said device 66 is moved in its forward direction upon the shaft or spindle 48 a suitably-constructed catch device 91, pivoted at 92 to the said device 66, will have its holding portion 93 brought in locked or holding engagement with a suitable stop 94 on the frame portion 43, the said catch device 91 being retained in its proper positions by means of a suitably-arranged spring 95, all of which will be clearly evident from an inspection of Figs. 4, 5, 7, and 9. As long as the said catch device 91 is retained in its holding engagement with the stop 94 the device 66 is prevented from returning to its normally-engaged position with the holding clutch-dog 56, and the shaft or spindle and the parts thereon will continue to turn as long as the crank 61 is operated. During these movements the slots 74 in the slides 71, 72, and 73 have been caused to register with the slots 69 and 70, and the coin is finally deposited in the receptacle 12; but the operative revolutions of the shaft or spindle 48, the intermediately-placed gearing, and that of the worm or conveyer 31 still continue until the said catch device 91 is disengaged from its holding or locked engagement with the stop 94, in the manner to be presently set forth. The disk 66 is then returned to its initial position upon the shaft or spindle 48 by the post 78 by means of a suitably-arranged and suitably-constructed spring 94, which has its ends bearing, respectively, against the post 78 and against the standard 89, as shown more particularly in Fig. 17, while the plates 71 and 73 are returned to their initial positions by a spring 97. (See also Fig. 17.) Of course the plate 71 is made with an elongated slot or opening 98, through which the lower part of the said post 78 extends to permit of a slight movement of the connected plates 71 and 73 without moving the plate 72 when the crank 61 is turned in the case that no coin has been dropped in the coin-chute. This movement of the plates 71 and 73 in such instance is absolutely necessary to permit the cam device 76, connected with the clutch-disk 47, to pass the roller 77 without actuating the remaining parts of the mechanism and without any danger of damage to the said parts.

Having thus set forth the general arrangement of the devices and parts for operating the worm or conveyer 31, we will now endeavor to describe the construction and operation of the mechanism for actuating the previously-mentioned slide-rod 38, which is employed for the closing and opening of the delivery-spout 26.

During the forward movement of the previously-mentioned catch device 91 the free end 99 of said device is brought against a weighted or counterbalanced end 100 of a pin or rod 101, which is pivotally arranged in bearings 102 of a suitably-constructed slide-frame 103. This frame 103 comprises a pair of frame-pieces 104 and 105, which are connected and are constructed in such a manner that the complete frame 103 and the parts connected with said frame may slide at the proper time along the outer surface of the previously-mentioned frame portion 43 and the said frame 103 being operatively held in place between the said frame portion 43 and the inner surfaces of the respective gears, the hubs of the latter extending into slotted or open parts of the said frame 103, so as not to interfere with the sliding motion of the latter. As soon as the catch device 91 has brought the said counterbalance 100 into the position indicated in Figs. 9 and 21, then the holding portion 93 will have engaged the stop 94 in the manner and for the purposes hereinabove set forth, and at the same time the rotary motion of the pin or rod 101 causes a right-angled or other suitably-constructed arm 105 on said rod 101 to be brought against an end portion 108 of a locking or holding latch 107, which is pivoted, as at 109, against a portion of the slide-frame 103 and has a nosing or holding end 110 normally extending into locked or holding engagement with a holding means 111, as a slot or cut-away part in the frame portion 43, as clearly indicated in Figs. 18 and 19. When in this position, the said slide-frame 103 is immovably held; but when the nosing 110 is raised from the slot or cut-away part 111 by the pressure of the arm 106 upon the end 108 of the latch 107 then the rotary motion of the gear 64, having a laterally-extending pin or projection 112 on its side, will bring this pin or projection 112 directly against an offset, as 113, or other suitable part of the slide-frame 103, (see Fig. 10,) whereby the several parts of the apparatus are brought into and held in the positions indicated in the several figures, 5, 11, 22, and 23, the catch device 91 still being prevented from returning to its initial position (indicated in Fig. 4) by the stop 94. The clutch mechanism is still in the proper position for actuating and operating the shaft 48 and by means of the revolving gear still turning the worm or conveyer 31. Connected with a bearing 114 at the side of the frame-piece 105 of the slide-frame 103 is a link 115, which is also pivotally attached to an arm 117 of a bell-crank 116. This bell-crank is capable of an oscillatory movement upon a post 118, suitably placed and secured in position upon the shelf 11. The bell-crank is also made with a long arm 119, having a bifurcated end 120, in which there is a slot 121, and by means of a pin 122 this arm 119 is operatively connected with the end 123 of the slide-rod 38 for opening and closing the delivery end of the spout 26. Thus while the pin or projection 112 of the gear 64 moves against the said offset 113 of the slide-frame 103 these several parts have moved from the position indicated in Fig. 6 to the position represented in Fig. 11, with the discharge end of the spout 26 delivering the soap until the gears 64 and 35 have made about or a trifle more than a three-quarter revolution each, when another pin or projection 124 on the side of the gear 35 is brought in engagement with a part 125 of the slide-frame 103, as illustrated in Fig. 12. During the remaining part of the revolution of the gear 35 the pin or projection 124 on said gear causes the slide-frame 103 to return to its initial starting-point, whereby the slide-rod 38 is caused to again close the discharge end of the delivery-spout 26 and the weight or counterbalance 100 is brought against the end portion of the catch device 91 in the manner indicated in Fig. 23 of the drawings. The holding portion 93 of the said catch device 91 will thereby be released from its locked or holding engagement with the stop 94. As soon as released from the said stop the springs 96 and 97 are free to act, and the device 66 in returning to its former position immediately forces the end of the clutch-dog 56 from its operative engagement with the disk 47, whereby the shaft or spindle 48 is once more brought into its normally inactive position, as will be clearly understood, until the mechanism is again actuated by another coin which has been dropped in the coin-chute. The mechanism all being arranged directly upon the shelf 11, by removing the back 6 of the box or casing 1, withdrawing the slide-panel 14, and unscrewing the crank 61 the entire mechanism can be easily removed from the casing or box by pulling out the shelf 11 for the purposes of repairing, cleaning, and oiling the various parts of the mechanism.

We are fully aware that many changes may be made in the various arrangements and combinations of the devices and their parts without departing from the scope of the present invention. Hence we do not limit our invention to the exact arrangements and combinations of the devices and their parts as described in the previous specification and as illustrated in the accompanying drawings, nor do we confine ourselves to the exact details of the construction of any of the said parts thereof.

Having thus described our invention, what we claim is—

1. In a soap-dispensing apparatus, a soap-receiver, a delivery-spout and bearings connected with said receiver, a reciprocating plunger movably arranged at one end in said spout and at its other end in one of said bearings, a tubular conveyer in said receiver, rotatively arranged on said plunger, an actuating means constructed to effect the operation of said conveyer, means for operating said plunger, and a coin-controlled mechanism for operating said actuating means, substantially as and for the purposes set forth.

2. In an apparatus for dispensing soap, a soap-receiver, a delivery-spout and bearings connected with said receiver, a reciprocating plunger movably arranged at one end in said spout and at its other end in one of said bearings, a tubular conveyer rotatively arranged on said plunger, an actuating means constructed to effect the operation of said conveyer, means for operating said plunger, and a coin-controlled clutch device for operating said actuating means, substantially as and for the purposes set forth.

3. In an apparatus for dispensing soap, a soap-receiver, a delivery-spout and bearings connected with said receiver, a reciprocating plunger movably arranged at one end in said spout and at its other end in one of said bearings, a tubular conveyer rotatively arranged on said plunger, an actuating means constructed to effect the operation of said conveyer, means for operating said plunger, a coin-controlled clutch device for operating said actuating means, and means for automatically arresting the action of said actuating means and the conveyer, substantially as and for the purposes set forth.

4. In an apparatus for dispensing soap, a soap-receiver, a delivery-spout connected with said receiver, a conveyer having a tubular portion, and means connected with said spout and slidably arranged in the tubular portion of said conveyer for normally closing the opening of said spout, and an actuating means for withdrawing the said spout-closing means from the delivery-opening in said spout, and a coin-controlled mechanism for operating the same, substantially as and for the purposes set forth.

5. In an apparatus for dispensing soap, a soap-receiver, a delivery-spout connected with said receiver, a conveyer having a tubular portion, mechanism constructed to effect the operation of said conveyer, a coin-controlled clutch device for operating said mechanism, means connected with said spout and slidably arranged in the tubular portion of said conveyer for normally closing the delivery-opening of said spout, and an actuating means for withdrawing said spout-closing means from the delivery-opening in said spout, substantially as and for the purposes set forth.

6. In an apparatus for dispensing soap, a soap-receiver, a delivery-spout connected with said receiver, a conveyer having a tubular portion, mechanism constructed to effect the operation of said conveyer, a coin-controlled clutch device for operating said mechanism, means connected with said spout and slidably arranged in the tubular portion of said conveyer for normally closing the delivery-opening of said spout, and actuating means for withdrawing said spout-closing means from the delivery-opening in said spout, and means for automatically arresting the action of the said conveyer-actuating mechanism and the means for actuating the spout-closing means, substantially as and for the purposes set forth.

7. In an apparatus for dispensing soap, a soap-receiver, a delivery-spout connected with said receiver, and a conveyer provided with a tubular portion, means for actuating said conveyer, a slide-rod in said tubular conveyer having one of its ends normally closing the delivery-opening of said spout, and means connected with the opposite end of said slide-rod for withdrawing said rod from the delivery-opening of said spout, and a coin-controlled mechanism for operating the same, substantially as and for the purposes set forth.

8. In an apparatus for dispensing soap, a soap-receiver, a delivery-spout connected with said receiver, and a conveyer provided with a tubular portion, means for actuating said conveyer, a slide-rod in said tubular conveyer having one of its ends normally closing the delivery-opening of said spout, and means connected with the opposite end of said slide-rod for withdrawing said rod from the delivery-opening of said spout, consisting, essentially, of a slide-frame, a link pivoted to said slide-frame, and a bell-crank, to one arm of which the other end of said link is pivotally attached, and the other arm of said bell-crank being connected with the said slide-rod, and a coin-controlled mechanism for operating the same, substantially as and for the purposes set forth.

9. In an apparatus for dispensing soap, a soap-receiver, a delivery-spout connected with said receiver, and a conveyer provided with a tubular portion, means for actuating said conveyer, a slide-rod in said tubular conveyer having one of its ends normally closing the delivery-opening of said spout, means connected with the opposite end of said slide-rod for withdrawing said rod from the delivery-opening of said spout, consisting, essentially, of a slide-frame, a link pivoted to said slide-frame, and a bell-crank, to one arm of which the other end of said link is pivotally attached, and the other arm of said bell-crank being connected with the said slide-rod, a coin-controlled clutch device for actuating the conveyer-operating means, a catch device and a latch also actuated by said clutch device for releasing the said slide-frame and permitting its movements, substantially as and for the purposes set forth.

10. In an apparatus for dispensing soap, a soap-receiver, a spout connected with said receiver, and a conveyer having a tubular portion, a set of gears for actuating said conveyer, means for actuating said gears, a slide-rod in said tubular conveyer having one of its ends normally closing the delivery-opening of said spout, a slide-frame, means between said slide-frame and the said slide-rod for actuating the said rod, and means connected with the said gears for causing, alternately, a forward and a backward sliding movement of the said slide-frame, and a coin-controlled mechanism for operating the same, substantially as and for the purposes set forth 11. In an apparatus for dispensing soap, a soap-receiver, a spout connected with said receiver, and a conveyer having a tubular portion, a set of gears for actuating said conveyer, means for actuating said gears, a slide-rod in said tubular conveyer having one of its ends normally closing the delivery-opening of said spout, a slide-frame, means between said slide-frame and the said slide-rod for actuating the said rod, and means connected with the said gears for causing, alternately, a forward and a backward sliding movement of the said slide-frame, consisting, of pins or projections extending from the sides of the said gears adapted to be brought in sliding engagement with portions of the said slide-frame, and a coin-controlled mechanism for operating the same, substantially as and for the purposes set forth.

12. In an apparatus for dispensing soap, the combination, with a soap-receiver, a spout connected with said receiver, and a conveyer, of means for actuating said conveyer, comprising, a shaft, a clutch device on said shaft, a coin-controlled device for operating said clutch device and causing the same to operatively engage the said shaft, a pinion on one end of said shaft, and a gear mechanism between said pinion and said conveyer, substantially as and for the purposes set forth.

13. In an apparatus for dispensing soap, the combination, with a soap-receiver, a spout connected with said receiver, and a conveyer, of means for actuating said conveyer, comprising, a shaft, a clutch device on said shaft, a coin-controlled device for operating said clutch device and causing the same to operatively engage the said shaft, a pinion on one end of said shaft, a gear mechanism between said pinion and said conveyer, a slide-rod connected with said conveyer for normally closing the delivery-spout of said soap-receiver, a slide-frame receiving a reciprocatory sliding movement from the said revolving gear mechanism, and means connected with said slide-frame for actuating said slide-rod and opening the delivery-opening of said spout, substantially as and for the purposes set forth.

14. In an apparatus for dispensing soap, the combination, with a soap-receiver, a spout connected with said receiver, and a conveyer, of means for actuating said conveyer, comprising, a shaft, a clutch device on said shaft, a coin-controlled device for operating said clutch device and causing the same to operatively engage the said shaft, a pinion on one end of said shaft, a gear mechanism between said pinion and said conveyer, a slide-rod connected with said conveyer for normally closing the delivery-opening of said spout, a slide-frame receiving a reciprocatory sliding movement from the said revolving gear mechanism, and means connected with the said slide-frame for actuating said slide-rod and opening the delivery-opening of said spout, consisting, of a link pivoted to said slide-frame, and a bell-crank to one arm of which the other end of said link is pivotally attached, and the other arm of said bell-crank being pivotally connected with said slide-rod, substantially as and for the purposes set forth.

15. In an apparatus for dispensing soap, the combination, with a soap-receiver, and means therein for forcing the soap from a delivery-spout, of a shaft, a clutch-dog on said shaft, a pair of clutch-disks loosely arranged on said shaft, a coin-controlled device, means on one of said clutch-disks for actuating said coin-controlled device and causing said second clutch-disk to be withdrawn from normal engagement with said clutch-dog, whereby said first-mentioned clutch-disk and said shaft become operatively connected, substantially as and for the purposes set forth.

16. In an apparatus for dispensing soap, the combination, with a soap-receiver, and means for forcing the soap from a delivery-spout, of a slide-rod for normally closing said spout, a shaft, a normally locked slide-frame, means connected with said slide-frame for actuating said slide-rod, a clutch device on said shaft, a catch device connected with said clutch device, a pivoted latch on said slide-frame adapted to be actuated by said catch device, and means adapted to be released by the movement of said latch and thereby place the slide-frame in position to be moved, and a coin-controlled mechanism for operating the same, substantially as and for the purposes set forth.

17. In an apparatus for dispensing soap, the combination, with a soap-receiver, and means for forcing the soap from a delivery-spout, of a slide-rod for normally closing said spout, a shaft, a normally locked slide-frame, means connected with said slide-frame for actuating said slide-rod, a clutch device on said shaft, a catch device connected with said clutch device, a pivoted latch on said slide-frame adapted to be actuated by said catch device, means adapted to be released by the said movement of said latch and thereby place the slide-frame in position to be moved, and mechanism operated from said shaft for actuating the soap-forcing means in the said soap-receiver and also causing a forward and a return movement of the slide-frame, consisting, of a pinion on said shaft, and a set of intermediately-arranged gears having laterally-extending projections for engaging portions of said slide-frame, and a coin-controlled mechanism for operating the same, substantially as and for the purposes set forth.

18. In an apparatus for dispensing soap, the combination, with a soap-receiver, having a delivery-spout, of a tubular conveyer rotatively arranged in said device, provided with a chamber 37 and an inlet 36, and a slide-rod in said tubular conveyer, having its one end normally extending into the delivery-opening of said spout to close said opening, but being capable of withdrawal from said opening to provide an unobstructed passage from said soap-receiving device through the inlet 36 and chamber 37 into the delivery-spout, and a coin-controlled mechanism for operating the same, substantially as and for the purposes set forth.

19. In an apparatus for dispensing soap, the combination, with a soap-receiver, having a delivery-spout, of a tubular conveyer rotatively arranged in said device, provided with a chamber 37 and an inlet 36, and a slide-rod in said tubular conveyer, having its one end normally extending into the delivery-opening of said spout to close said opening, but being capable of withdrawal from said opening to provide an unobstructed passage from said soap-receiving device through the inlet 36 and chamber 37 into the delivery-spout, a laterally-extending frame portion 43 connected with said soap-receiver, provided with a slotted part 111, a slide-rod in said conveyer, and a pivoted holding-latch 107 normally in holding engagement with said slotted part 111 normally to prevent the moving of said slide, and a coin-controlled mechanism for operating the same, substantially as and for the purposes set forth.

20. In an apparatus for dispensing soap, the combination, with a soap-receiver, having a delivery-spout, of a tubular conveyer rotatively arranged in said device, provided with a chamber 37 and an inlet 36, and a slide-rod in said tubular conveyer, having its one end normally extending into the delivery-opening of said spout to close said opening, but being capable of withdrawal from said opening to provide an unobstructed passage from said soap-receiving device through the inlet 36 and chamber 37 into the delivery-spout, a laterally-extending frame portion 43 connected with said soap-receiver, provided with a slotted part 111, a slide-rod in said conveyer, a pivoted holding-latch 107 normally in holding engagement with said slotted part 111 normally to prevent the moving of said slide, and means for actuating said latch 107, consisting, of a pin oscillating in bearings on said slide-frame, an arm on said pin adapted to be brought in engagement with said latch 107, a weight on said pin, and means arranged to tilt said weight and thereby oscillate said pin and its arm, and a coin-controlled mechanism for operating the same, substantially as and for the purposes set forth.

In testimony that we claim the invention set forth above we have hereunto set our hands this 10th day of February, 1902.

NATHAN J. CROWELL.
LINFORD R. WANGER.
SIMON WRIGHT.

Witnesses:
  FREDK. C. FRAENTZEL,
  GEO. M. TITUS.